April 15, 1947.　　　　R. K. HOPKINS　　　　2,419,139
ELECTRODE HOLDER AND SHIELD
Filed Jan. 17, 1945
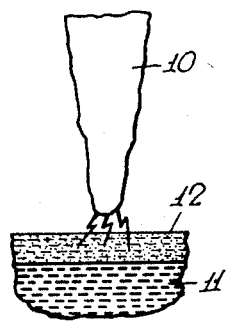
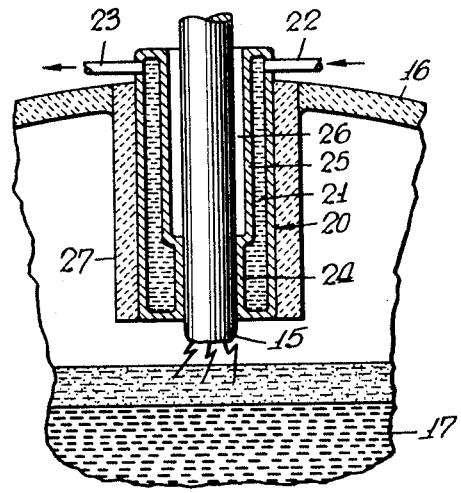
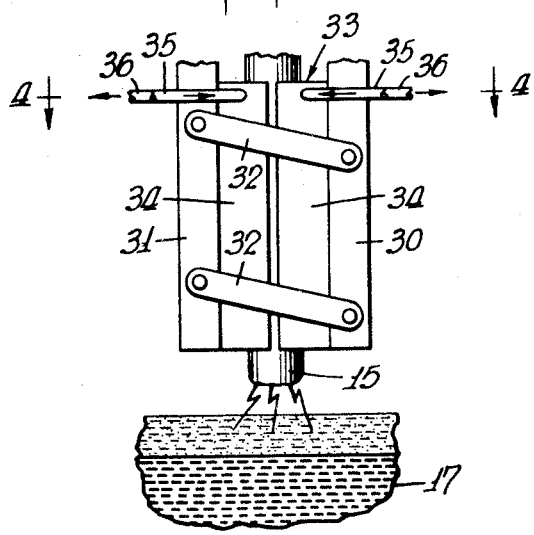
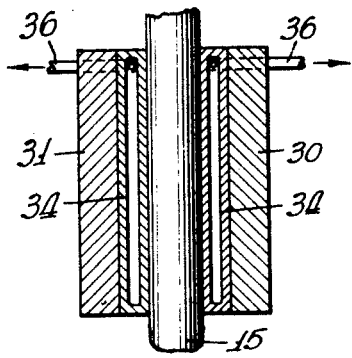
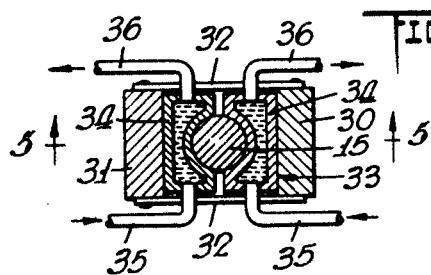
INVENTOR
Robert K. Hopkins
BY Virgil F. Davio
ATTORNEY Patented Apr. 15, 1947

2,419,139

UNITED STATES PATENT OFFICE 2,419,139

ELECTRODE HOLDER AND SHIELD

Robert K. Hopkins, New York, N. Y., assignor to The M. W. Kellogg Company, New York, N. Y., a corporation of Delaware Application January 17, 1945, Serial No. 573,221

2 Claims. (Cl. 13—14)

The present invention relates to consumable electrodes, such as those used in the metallurgical field, and more particularly to the means and method for protecting such electrodes against excessive destruction along their sides.

Consumable electrodes, such as those of carbon or graphite, ordinarily used in electric arc furnaces, are wasted away along their sides almost as fast or faster than at their tips where the effective current discharge work is done. This rapid consumption of the electrode along its sides is due mainly to the rapid oxidation resulting from the high temperatures present, and causes the electrode to taper towards its tip, so that this tip is materially reduced in area. This increases the current density at this tip, and in turn increases the rate of endwise consumption of the electrode.

One object of the present invention is to provide a new method and device for protecting the sides of a consumable high temperature electrode against excessive waste or corrosion.

In accordance with certain features of the present invention, there is provided around the consumable electrode a protective shield extending into the furnace to within a short distance from the metal and slag bath therein. This protective shield is designed to blanket the sides of the electrode against the high temperature in the furnace, and for that purpose, is desirably in the form of a liquid-cooled jacket. This jacket substantially seals the major portion of the peripheral surface of the electrode near its current discharge end against access of the air, and by maintaining this surface comparatively cool, keeps the rate of oxidation thereof comparatively low.

Various other objects, features and advantages of the invention will be apparent from the following particular description, and form an inspection of the accompanying drawings, in which:

Fig. 1 is a fragmentary view showing the ordinary unprotected electrode wasted away at the sides after a period of use;

Fig. 2 is a fragmentary vertical section somewhat diagrammatic showing a form of electrode shielding device embodying the present invention;

Fig. 3 is a fragmentary vertical section somewhat diagrammatic of another form of electrode shielding device embodying the present invention;

Fig. 4 is a section taken on line 4—4 of Fig. 3; and

Fig. 5 is a section taken on line 5—5 of Fig. 4.

Fig. 1 shows an ordinary unprotected electrode 10 of amorphous carbon or graphite in position in a furnace to heat a charge of metal 11 covered by the usual slag 12. The electrode 10 operates by terminal current discharge to heat the metal 11, and when first installed, is of cylindrical shape. However, due to the exceedingly high temperatures prevailing in the furnace around the electrode 10, the sides thereof are consumed very rapidly, mainly as a result of the high rate of oxidation caused by such high temperatures. This condition causes the electrode 10 to be tapered towards its current discharge tip during use, as shown in Fig. 1, so that its rate of endwise consumption is correspondingly increased.

Fig. 2 shows a form of device by which a consumable electrode can be protected against rapid consumption of its sides in accordance with certain features of the present invention. The invention in Fig. 2 is shown applied to a solid cylindrical electrode 15 of the usual well-known consumable type made, as for example, from amorphous carbon or graphite. Electrode 15 is shown suspended from the roof 16 of a furnace into which it projects to within arcing distance from the slag-covered metal charge 17. The furnace may be of any suitable type. For example, it may be of the Heroult type or of the Girod type.

To prevent the sides of the electrode 15 from wasting away too rapidly, there is provided a sleeve 20 which embraces the electrode with a snug fit just loose enough to permit the electrode to be axially fed therethrough as it is consumed endwise, and which substantially seals the lower peripheral section of the electrode against air contact. Sleeve 20 is desirably designed to maintain the lower peripheral section of the electrode 15 comparatively cool, and for that purpose, is in the form of a hollow jacket having a space 21 for circulating a suitable cooling medium such as water therethrough. Sleeve 20 extends through the roof 16 of the furnace, and is provided at its upper end on the outside of said furnace with an inlet connection 22 and an outlet connection 23 for the cooling medium. The sleeve 20 may be sectionalized into a plurality of segments held together in longitudinal edge to edge contact, and is desirably shaped so that its lower inner peripheral section 24 embraceably contacts the electrode 15 along a longitudinal section of said electrode of substantial length spaced from but close to the current discharge tip of said electrode, while its upper inner peripheral section 25 is circumferentially distanced from said electrode to define an annular clearance space 26 around said electrode. Since the clearance space 26 is out of contact with the air in the furnace, and is open to the atmosphere outside the furnace, said space will be kept comparatively cool, both by the outside air and the cooling effect of the sleeve 20, so that the portion of the electrode 15 along said space 26 will not be rapidly consumed. At the lower section of the electrode 15 where the higher temperatures prevail, said electrode is maintained at a comparatively low temperature by the cooling action of the sleeve 20 in direct heat transfer contact therewith.

The sleeve 20 is made of a metal having high conductivity, and is desirably of copper, the cooling medium maintaining the temperature of said copper below its fusing temperature.

Depending on construction of the sleeve 20, it may be desirable to protect the outer periphery of said sleeve against the high temperatures prevailing in the furnace. For this purpose, the outside of the sleeve 20 is desirably protected by an insulating covering 27 made, as for example, from refractory material, and extending from the furnace roof 16 substantially along the full length of said sleeve. Under certain conditions, this insulating covering 27 may be dispensed with.

Since the electrode 15 burns off at its hot end and the depth of metal or height of the charge 17 varies considerably during operations, provision is made for moving said electrode vertically to maintain the proper arcing length. This feeding action is controlled automatically by means of voltage regulators well-known in the art.

The necessary current for discharge at the electrode tip may be delivered to the electrode 15 by any suitable means outside the furnace, as is well-known in the art, or may be delivered through the sleeve 20, so that said sleeve serves as a current contact member.

The electrode 15 is peripherally protected against rapid sidewise oxidation as a result of the air sealing action and cooling action of the protective sleeve 28, so that the electrode will be maintained substantially cylindrical in shape, and will be consumed only substantially endwise. The tip area will thereby be maintained substantially constant.

In Figs. 3 to 5, the invention is shown applied to an electrode holding device of the general type shown in my Patent No. 2,350,233. In accordance with this form of the present invention, there is provided a pair of parallel electric conductors 30 and 31, shown in the form of square copper bars flanking opposite sides of the electrode 15. One of these conductor bars 30 is fixed against movement, while the other conductor bar 31 is connected to said fixed bar 30 by parallel inclined pivoted links 32, and is urged endwise and angularly with respect to said fixed bar 30 by spring means, as for example, in the manner described in the aforesaid patent.

Embracing the consumable electrode 15 with a snug slide fit is a protective sleeve 33, shown of longitudinally split construction to define two similar electric contact shoes 34. These contact shoes 34 are affixed to the inner sides of the respective bars 30 and 31, and are resiliently but firmly clamped around the electrode 15 by the spring-pressed action of the conductor bar 31. The clamping pressure of the contact shoes 34 on the electrode 15 is not sufficiently great to prevent feeding of said electrode through said shoes as it is consumed endwise.

The contact shoes 34 are of hollow construction to permit the circulation of a cooling medium such as water therethrough, and are provided near their upper ends with inlet and outlet connections 35 and 36 for said cooling medium. These contact shoes 34 are made of metal having high heat conductivity such as copper, and extend almost to the tip of the electrode 15. They serve thereby not only to protect the sides of the electrode 15 against rapid oxidation, but also serve to conduct the necessary current from the bars 30 and 31 to said electrode.

The two contact shoes 34 are spaced apart a distance sufficient to permit relative automatic alignment of these shoes into proper contact engagement with the electrode 15 as said electrode is fed into the current discharge heating zone of the furnace. Although the interspacing of the contact shoes 34 exposes two diametrically opposite longitudinal sections of the electrode 15 to the air in the furnace, the width of these sections is too small to cause any substantial waste or consumption of the electrodes along their sides.

The device shown in Figs. 3 to 5 may be applied to a furnace such as that shown in Fig. 2, or may be employed in any metallurgical unit in which a consumable electrode is exposed to high temperatures.

Although the protective sleeve sections 34 are illustrated as serving as electric contact members, as far as certain features of the present invention are concerned, these sleeve sections 34 may serve merely as a means to protect the sides of the consumable electrode 15 near its tip against excessive oxidation and air access, and current may be supplied to said electrode by some other suitable expedient above said sleeve sections.

As many changes can be made in the above method and apparatus, and many apparently widely different embodiments of this invention can be made without departing from the scope of the claims, it is intended that all matter contained in the above description or shown in the accompanying drawings shall be interpreted as illustrative and not in a limiting sense.

What I claim is:

1. In a metallurgical furnace, a consumable electrode for creating a high temperature heating zone in said furnace by current discharge between its tip and the metal bath in said furnace, said electrode projecting downwardly in the interior of said furnace from the roof thereof, a fixed hollow jacket around said electrode extending along the projecting portion of said electrode from said roof to a region spaced from but close to said tip, said jacket having an inlet and outlet for the circulation of a cooling medium therethrough, and embracing said electrode with a snug slide fit to permit said electrode to be fed downwardly therethrough towards said zone as it is consumed endwise, and a heat insulating covering around said jacket adapted to shield said jacket from direct exposure to the heat in said furnace.

2. In a metallurgical furnace, a consumable electrode for creating a high temperature heating zone in said furnace by electric current discharge between its tip and the metal bath in said furnace, said electrode projecting downwardly in the interior of said furnace from the roof thereof, a hollow jacket around said electrode extending along the projecting portion of said electrode from said roof to a region spaced from but close to said tip, said jacket having an inlet and outlet for the circulation of a cooling medium therethrough, and an insulating lining covering said jacket and adapted to shield said jacket from direct exposure to the heat in said furnace, the lower portion of said jacket snugly embracing said electrode to provide sufficient contact for passage from one to the other of the electric current discharged from said tip while permitting said electrode to be fed through said jacket as said electrode is consumed endwise.

ROBERT K. HOPKINS.

REFERENCES CITED

The following references are of record in the file of this patent:

UNITED STATES PATENTS

| Number | Name | Date |
|---|---|---|
| 1,018,727 | Ruthenburg | Feb. 27, 1912 |
| 1,677,712 | Dion | July 17, 1928 |
| 1,751,177 | Sem et al. | Mar. 18, 1930 |
| 1,972,849 | Wisdom | Sept. 4, 1934 |

FOREIGN PATENTS

| Number | Country | Date |
|---|---|---|
| 4,175 | British | Feb. 20, 1909 |
| 121,485 | British | Aug. 26, 1920 |
| 750,542 | British | May 29, 1933 |
| 41,682 | Norwegian | July 27, 1925 |